United States Patent
Dent (10) Patent No.: US 6,625,200 B1
(45) Date of Patent: Sep. 23, 2003

(54) MULTI-STAGE CDMA SYNCHRONIZATION WITH PARALLEL EXECUTION

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/236,083

(22) Filed: Jan. 25, 1999

(51) Int. Cl.⁷ .............................................. H04L 27/30
(52) U.S. Cl. ...................... 375/142; 375/145; 375/149; 375/150; 375/343; 375/367; 370/335; 370/342; 370/441; 370/479
(58) Field of Search ................................ 375/142, 143, 375/145, 149, 150, 152, 343, 367, 368; 370/335, 342, 441, 479

(56) References Cited

U.S. PATENT DOCUMENTS

| | | | |
|---|---|---|---|
| 5,305,349 A | 4/1994 | Dent .............................. | 375/1 |
| 5,544,155 A | 8/1996 | Lucas et al. ................... | 370/18 |
| 5,572,552 A | 11/1996 | Dent et al. ................... | 375/343 |
| 5,729,571 A | 3/1998 | Park et al. ................... | 375/206 |
| 5,758,288 A | 5/1998 | Dunn et al. ................... | 455/456 |
| 5,805,584 A * | 9/1998 | Kingston et al. ............ | 375/342 |
| 5,825,835 A | 10/1998 | Kingston et al. ............ | 375/367 |
| 5,828,662 A | 10/1998 | Jalali et al. ................... | 370/335 |
| 5,910,948 A * | 6/1999 | Shou et al. ................... | 370/335 |
| 6,178,197 B1 * | 1/2001 | Froelich et al. .............. | 375/150 |
| 6,377,613 B1 * | 4/2002 | Kawabe et al. .............. | 370/342 |

FOREIGN PATENT DOCUMENTS

| | | |
|---|---|---|
| EP | 0 825 737 | 2/1998 |
| GB | 2 287 613 | 9/1995 |
| WO | WO98/35458 | 8/1998 |
| WO | WO98/47238 | 10/1998 |
| WO | WO99/00912 | 1/1999 |

OTHER PUBLICATIONS

Fukasawa, A., et al., "Wideband CDMA System for Personal Radio Communications", IEEE Communications Magazine, vol. 34, No. 10, Oct. 1, 1996, pp. 116–123, XP000694488.

Dahlman, E., et al., "UMTS/IMT–2000 Based on Wideband CDMA", IEEE Communications Magazine, vol. 36, No. 9, Sep. 1, 1998, pp. 70–80, XP000784828.

* cited by examiner

Primary Examiner—Stephen Chin
Assistant Examiner—Dac V. Ha
(74) Attorney, Agent, or Firm—Coats & Bennett, P.L.L.C.

(57) ABSTRACT

Methods and systems for time synchronizing a receiver to a spread spectrum signal are described. Exemplary embodiments of the present invention provide for at least a two step process in which, at a first step, a number of candidate synchronization frequencies or timings are identified, followed by confirming one of the candidates as a correct synchronization state at a second or final step. According to the present invention, the confirmation step may be performed at the same time as the step of identifying further candidates by processing the same received signal samples in different ways.

30 Claims, 6 Drawing Sheets

MULTI-STAGE CDMA SYNCHRONIZATION WITH PARALLEL EXECUTION

BACKGROUND

The present invention relates to mobile phones or radio apparatus for receiving spread spectrum signals, such as code division multiple access (CDMA) signals, with which time synchronization is achieved.

Radiocommunication systems involve the transmission of information over an air interface, for example by modulating a carrier frequency with that information. Upon reception, a receiver attempts to accurately extract the information from the received signal by performing an appropriate demodulation technique. However, in order to demodulate a received signal, it is first necessary to synchronize timing between the transmitter and the receiver. Different levels of synchronization may be required depending upon the design of the radiocommunication system. For example, in most systems clocking differences between the transmitter and the receiver create differences in timing at a bit level. Moreover, in some radiocommunication systems, information is transmitted in bursts, sometimes referred to as "frames", which represent chunks of information that are independently detected and decoded. In these types of systems it is also desirable to locate the beginning of a frame, so that information relevant to a particular receiver is isolated and demodulated. Likewise, some systems (e.g., time division multiple access or TDMA systems) further subdivide frames into timeslots to create channels that are time multiplexed with one another. In these systems it is further desirable to synchronize the receiver to the beginning of each timeslot.

Some systems provide channelization using a spread spectrum technique known as code division multiple access (CDMA). In CDMA systems, the information data stream to be transmitted is first coded or spread using a unique spreading code and then combined with a long PN-sequence or a shorter scrambling-sequence. In the latter case, the scrambling-sequences are planned from cell to cell so that neighboring cells use different scrambling-sequences or scrambling-masks. The information data stream and the PN-sequence or the scrambling sequence can have the same or different bit rates. The multiplication of the information data stream with the unique spreading code and long PN-sequence results in an output stream of chips. Thus, in CDMA systems, it is also desirable to synchronize the receiver to the chip boundaries.

Figure 1:
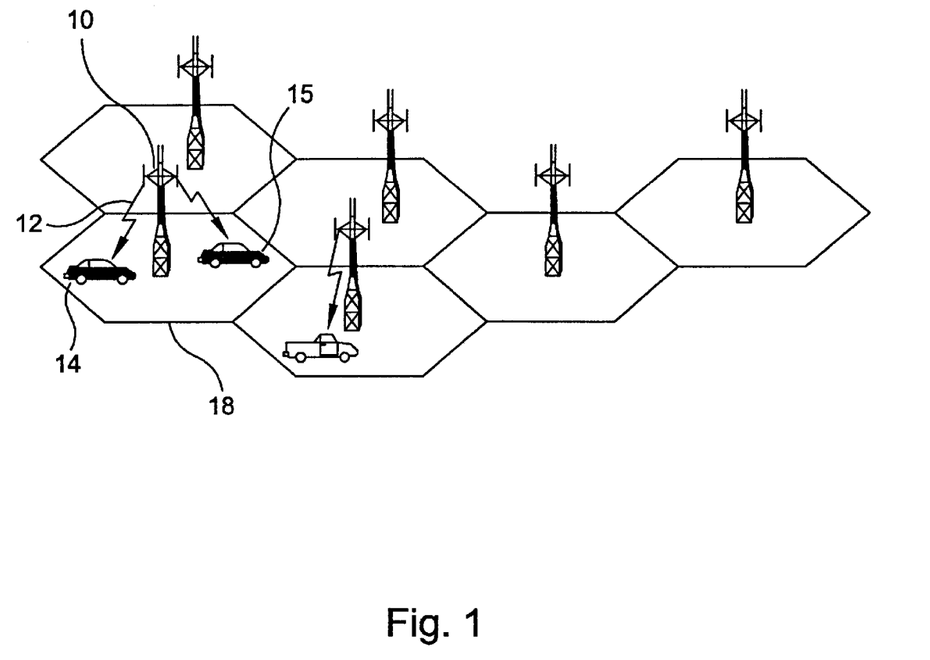
FIG. 1 illustrates an exemplary CDMA radiocommunication system in which the present invention may be employed.

To further understand the synchronization tasks associated with signal processing in a CDMA radiocommunication system, consider the following example. FIG. 1 illustrates the use of base stations to transmit radio waves to mobile users (mobile stations) in a cellular system. In a CDMA system, base station 10 can transmit signals to mobile stations 14 and 15 as a single (composite) signal. The signal directed to mobile station 14 is typically coded with a short code that is orthogonal or mostly orthogonal to a short code that is used to code the signal directed to mobile station 15. These signals are then spread with a second code that is sometimes referred to as a long code, associated with base station 10. The sum of the two coded and spread signals is then transmitted by base station 10.

When mobile station 14 receives the composite signal, mobile station 14 multiplies the spread signal with the long code and the short code to recreate the signal directed to mobile station 14 and the signal directed to mobile station 15 is suppressed as interference noise. Similarly, mobile station 15 multiplies the spread signal with the long code and the short code assigned to mobile station 15 to recreate the signal directed to mobile station 15 and the signal directed to mobile station 14 is suppressed as interference noise. The receivers associated with mobile stations 14 and 15 must have acquired the various levels of synchronization to the received signal which were described above, in addition to learning or knowing the applicable long and short codes, in order to implement despreading, demodulation and decoding of the information residing in that signal. Many different techniques have been developed in order to acquire synchronization at each of the various levels. For frame synchronization these techniques typically depend, in large degree, on the frame structure and the manner in which overhead or control information is conveyed to the mobile station. Overhead information is usually provided on one or more broadcast control channels which are transmitted by base stations using known channels to which mobile stations can quickly lock onto and receive the overhead information including, among other things, information used to acquire frame synchronization with that base station. Those skilled in the art will appreciate that many radiocommunication systems have unsynchronized base stations, i.e., base stations which do not share a common timing reference signal. Accordingly, frame synchronization is a process which needs to be performed, for example, at start-up (i.e., when a mobile is powered on), as a mobile station moves from cell to cell and when measuring on channels associated with neighboring cells as part of cell reselection procedures (e.g., to confirm that a mobile station is listening to a "best" serving base station).

Of course, as with most signal processing tasks performed by the receiver, reducing the delay associated with synchronization is important in improving the receiver's performance. Many types of communication services, in particular speech communication, are relatively delay intolerant. Thus, system designers are continuously seeking for ways in which to reduce the amount of time that it takes to perform any given signal processing task, including time synchronization.

SUMMARY

A radio receiver employing a synchronization method according to the present invention is able more rapidly to find and acquire synchronisation with a CDMA signal by means of at least a two step process in which, at a first step, a number of candidate synchronisation frequencies or timings are identified, followed by confirming one of the candidates as a correct synchronisation state at a second or final step. According to the present invention, the confirmation step may be performed at the same time as the step of identifying further candidates by processing the same received signal samples in different ways.

In an exemplary implementation, a first correlation means correlates shifts of a stream of received signal samples using a correlation length over which the received signal does not drift significantly in phase, amplitude or timing, thus allowing coherent correlation. Coherent correlations are not in general expected to reach a sufficient signal-to-noise ratio to unambiguously identify with adequate certainty that correct synchronisation has been achieved. Consequently a number of coherent correlations corresponding to like timing postulates are further accumulated non-coherently in a number of bins, each bin corresponding to a timing postulate. Non-coherent accumulation involves adding the magnitudes or square magnitudes of the coherent correlations, where the squared magnitude is equal to the sum of the squares of the real and imaginary parts of the coherent correlation value.

When non-coherent or magnitude accumulation must take place for a prolonged time period in order to identify a likely candidate timing, and the time period is so long that a drift of timing may occur that is of the order of plus or minus one timing bin width or more, the present invention may employ a drift compensation type of accumulation described in U.S. patent application Ser. No. 08/768,975 to Paul W. Dent, filed Dec. 18, 1996, the disclosure of which is hereby incorporated by reference herein.

An exemplary CDMA system according to the present invention, using a 4 megachip per second modulation, searches time bins that are one chip wide, i.e. 0.25US. The receiver time and frequency reference has an initial error of +/−10 parts per million, which results in a drift of one bin per 25 mS. This exemplary CDMA system furthermore transmits a known chip pattern every 0.625 mS for use by the receiver to achieve a first synchronization step. The known chip pattern has a length of 256 chips for example. With 10 ppm frequency error, the maximum coherent correlation length is restricted to about 64 chips. Therefore four, 64-chip coherent correlations are accumulated non-coherently every 0.625 mS to determine a correlation value with the known 256-chip pattern. Approximately 40 of these 0.625 mS correlations may then be accumulated non-coherently, after which the timing may have drifted one chip. To compensate for such drift, after a number of non-coherent accumulations less than 40, for example 16, the results for each bin are accumulated with the best of previous cumulative results lying within +/−1 bin, thus allowing a drift of +/− one bin in 16 while still providing continued accumulation. In the above exemplary system, the number of timing bins is approximately 0.625 mS×4 megachips/sec, that is about 2500 bins of one-chip width.

Drift-compensated accumulation continues according to the present invention until a cumulative results bin reaches a threshold. This indicates that the known signal pattern may have been found at the timing corresponding to the threshold. The timing associated with that bin is then recorded in a list of candidate timings to be further evaluated, and the bin contents reset to zero. Drift compensated accumulation of correlations with the known signal pattern then continues and as further bins reach the first threshold, their associated timings are also entered into the list and their bin contents reset to zero. Eventually, a bin already reset to zero at least once may again reach the threshold value and would then be entered into the list a second time. The list thus contains candidate timings in the order in which they reached the first correlation threshold, including possible repeats of an earlier candidate timing. Drift-compensated accumulation in timing bins can comprise subtracting the minimum value over all bins from all the bins, so as to emphasize differences between the bin values and prevent indefinite growth of numerical values. Detecting that a bin value reaches a threshold can then imply detecting that a bin value has exceeded the other bin values by a threshold.

In the exemplary CDMA system, many signals may be transmitted in the same bandwidth at the same time using different spreading codes, preferably orthogonal codes. In addition to the above-mentioned known signal pattern, which typically uses the same code, regardless of the transmitter, a second signal pattern is transmitted that is selected to be different for different transmitters in an adjacent group of transmitters. The second signal pattern being one of a limited number of, for example, 16 predetermined patterns. A second stage of synchronisation therefore consists of determining if one of the second known signal patterns can be found at a timing shift recorded in the candidate list derived in the first step described above. Because the second known signal pattern is transmitted at the same time and on the same frequency as the first known signal pattern, they are both received overlapping at the receiver and correlations may be performed using the second known symbol pattern by a second correlation means simultaneously with continuing to perform and accumulate correlations with the first known signal pattern using the first correlation means. The invention of Dent and Wang described in U.S. patent application Ser. No. 08/967,444, entitled "Efficient Correlation Over a Sliding Window" (filed Nov. 11, 1997) may, for example, advantageously be employed to combine the first and second correlation means taking advantage of common computations to reduce effort and therefore power consumption.

Correlations are performed with all 16 of the second known signal patterns, but using only that timing shift identified with the first candidate in the list. According to a second aspect of the present invention, correlations with the first known signal pattern may also be used to estimate a frequency error, which is also stored in the list against candidate timings. When using a candidate timing to test for correlations with the 16 second known signal patterns, the frequency error estimate may be used to compensate the received signal for phase drift, allowing a longer coherent second correlation to be performed. When one of the 16 second correlations has reached a second threshold, the timing, frequency error estimate and the second known symbol pattern giving that correlation may be recorded in a second list of candidates to be tested in an optional third synchronization step. The present invention can optionally comprise performing simultaneous correlations with the second known symbol patterns using more than one of the timings from the candidate list in parallel. The results would be accumulated in 16N bins, where N is the number of simultaneously tested candidates. When any one of the 16N correlations reaches the second threshold, the associated second known code, timing and frequency error are transferred to the second list. The second list thus contains second correlations in the order in which their accumulations first reached the second threshold.

In the exemplary system, the second known symbol pattern identifies a group of third known symbol patterns, one of which should be found in a third correlation step. The present invention may be applied again to search simultaneously for a third correlation while continuing first and second correlation accumulations. The third correlation is performed using all known symbol patterns in the group, which once again may, for example, contain 16 members. When a third correlation is identified, the method has thus disambiguated which of 256 different signal waveforms are in use, i.e. the CDMA spreading code used by the transmitter has been narrowed down to one candidate. Using that code, an attempt is then made to decode a broadcast control channel emitted by the transmitter, successful decoding being indicated, for example, by a Cyclic Redundancy Check Code (CRC). This final step confirms that a valid signal has been identified and sychnronisation achieved.

A further uncertainty that is resolved by the method is which of a number of frequency channels the transmitter is using. This is done by applying the method sequentially to all possible frequency channels selected intelligently in a priority order. For example, a frequency channel on which sync was previously found most recently can be tested first. Moreover, sync search on any frequency channel may be abandoned at any stage if the correlation accumulation for that stage fails to reach the threshold for that stage in a given time.

BRIEF DESCRIPTION OF THE DRAWINGS

The features, objects, advantages and other aspects of the present invention will be more readily understood upon reading the following detailed description in conjunction with the figures, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 2A:
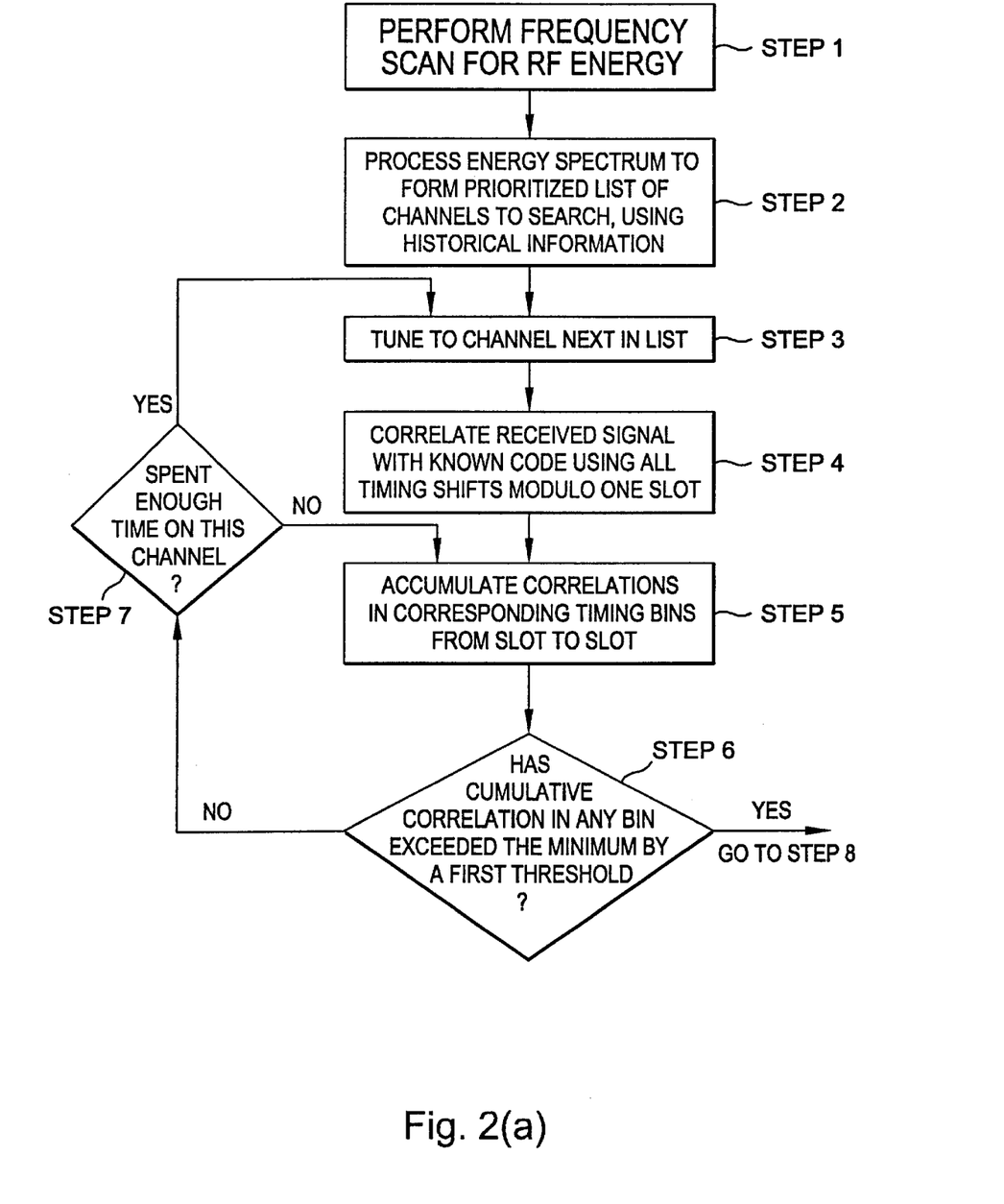
FIGS. 2(a)–2(d) depict a flowchart which is used to described exemplary methods and systems for performing synchronization according to exemplary embodiments of the present invention.

In FIG. 2(a), a radio receiver, such as a mobile phone, performs a scan of the allocated frequency band in step 1 upon first being switched on after a period of inactivity. The frequency scan step identifies channels on which RF energy is detected and can measure the signal strength of detected RF energy. In step 2, other information is used to determine a prioritized list of channels that will be searched in order. In the absence of other information, the prioritized order can be signal strength order from strongest to weakest. Other information that can change this order would, for example, include knowledge of channels on which valid signals had been found before.

For example, if the signal strength now received on a channel on which sync was established most recently is similar to that measured when valid synchronisation was last achieved on that channel, it may be given highest priority. If the most recent sync channel does not have the highest signal strength, but the signal strength on a different channel on which sync is often established is high, then the different channel may be given priority. Another example of other information which may affect the scanning order is a list of channels on which sync has never been established or never been established even when signal strength is high (because, for example, they might be allocated to a different type of system). These channels may be given lower priority than their measured signal strength would otherwise indicate. Another reason why channels may be given low priority is when receiver frequency step sizes are narrower than the system's channel spacing. For example, receiver resolution could be 200 KHz while a particular system places signals centered only on every 25th 200 KHz step. A radio receiver could learn on which of the 25 steps sync is most often achieved and give those higher priority for searching than the other 24, depending of course on whether the scan for energy confirms the likelihood that these steps are still those to use. All such logic can be used in step 2 to establish a prioritized frequency channel list.

In step 3, the receiver tunes to the next channel in the list, which is the first channel on the first pass through the flow chart. In step 4, the signal received on the tuned channel is processed using, for example, a correlator or matched filter matched to a known code. Exemplary matched filter structures are disclosed in U.S. patent applications Ser. No. 08/967,444, filed Nov. 11, 1997 (Ericsson Docket #PO 8668) to Dent and Wang entitled "Efficient Correlation Over a Sliding Window" as described supra, which is hereby incorporated by reference herein. These inventive correlation techniques allow received signal samples to be correlated with a known code with all possible timing shifts between the known code and the signal samples being correlated simultaneously.

Moreover, correlations can be performed using more than one code simultaneously with less than a commensurate increase in effort. Using these inventive correlators or matched filters, the savings in effort increases, the greater the number of correlations that have to be calculated. This property will prove useful in the current invention which performs synchronisation in several stages using different codes, with all stages running in parallel.

Figure 3:
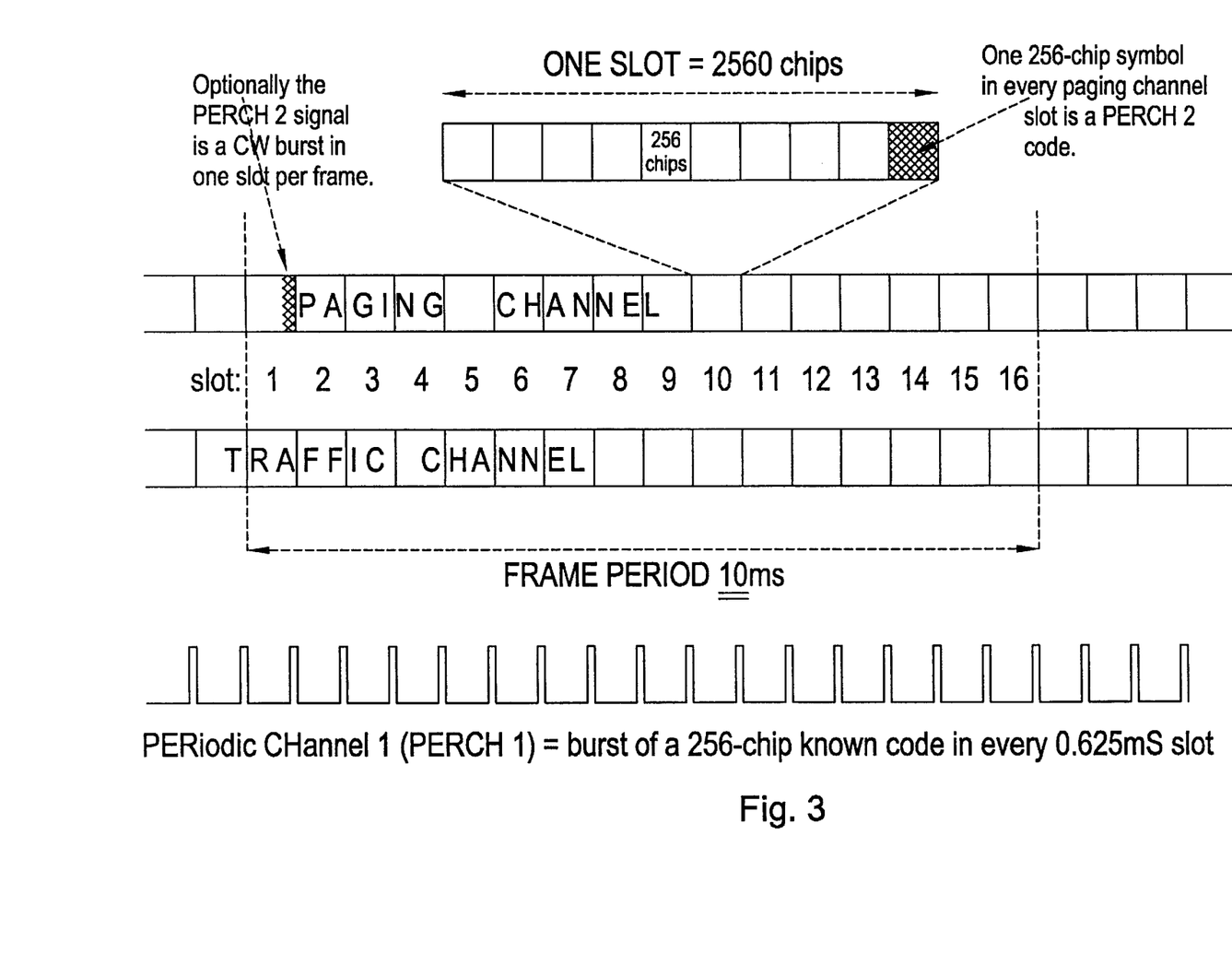
FIG. 3 shows a CDMA signal format to which the present invention may be applied.

The correlations computed in step 4 for different timing shifts between the received signal and the known code are accumulated with like values computed from a repetition of the same signal at periodic intervals. Such a signal format is shown in FIG. 3. A CDMA signal waveform allows several different signals to overlap in time and frequency by the use of different codes, which permit a receiver to separate the overlapping signals. In FIG. 3, three types of signal are shown overlapping;

(1) a Traffic Channel, which is divided into 10 mS frame periods which are further subdivided into 16, 0.625 mS timeslots;

(2) a Paging channel, which has the same frame and slot structure as the Traffic channel, although it may be of a different power level, and with other differences in the finer structure. One such difference is that the paging channel slots are divided into ten, 256-chip symbols, nine of which use a code unique to a particular transmitter selected from a set of 256 codes while the tenth symbol uses one of a subset of 16 codes and is called the second Periodic Channel or PERCH 2; and (3) a first Periodic Channel (PERCH 1) which comprises bursts of 256 chips using a code which is common to all transmitters. Moreover, the PERCH 1 bursts are aligned in time with the PERCH 2 occurrences on the Paging Channel.

Optionally, one of the PERCH 1 or PERCH 2 occurrences may occasionally at regular intervals be an "unmodulated burst", such as would be achieved by setting all 256 chips to the same value, or systematically phase-rotating value, the latter giving a frequency-offset CW burst. These CW bursts can be useful in providing the receiver with an opportunity to obtain coarse time and frequency synchronisation before beginning step 4 of FIG. 2(a).

Techniques for utilizing such CW bursts in the context of TDMA signals (but not overlapping CDMA signals) are known from the European Digital Cellular System called GSM and, therefore are not elaborated here. The current description however continues without reference to whether coarse synchronisation is achieved with the aid of CW bursts or not. Instead, the most onerous case is assumed, i.e., in which the frequency and time uncertainty over which the sync search is performed is not reduced. Consequently, in accordance with the exemplary waveform of FIG. 3, correlation with the PERCH 1 code can be found at any one of the 2560-chip shifts over the one-slot repetition period of the code.

It is also assumed that one 256-chip correlation will not yield an adequate YES/NO detection decision. An aim of the present invention is to permit a receiver to acquire time and frequency synchronisation even when the signal strength is too low to establish a normal traffic channel, such as when a mobile phone user is deep inside a building. The aim of future cellular systems will be to provide a high-penetration method of alerting the phone that it is being called even in such disadvantaged circumstances, and conveying a short message, such as the caller-ID using highly redundant signaling. However, even using such highly redundant signaling, synchronisation must first be established in order to decode the signal.

In order to improve the synchronisation robustness, corresponding correlations from corresponding timings in successive slots are accumulated in step 5. Since the timing uncertainty is 2560 chips in this example, 2560 timing bins are used to accumulate correlations corresponding to each particular timing postulate.

A correlation between a complex radio signal and a given code yields a complex number having an amplitude and a phase. The phase remains constant only over a limited time due to fading or frequency error. In an exemplary 2 GHz radio system fading rates would allow correlations of length 256-chips or more to be made, but the result would exhibit a different phase angle from slot to slot due to the fading changing the signal phase over the 0.625 mS slot separation time. Consequently, only the magnitudes or magnitudes squared of the correlations are accumulated from slot-to-slot, which is termed "non-coherent" accumulation in the art.

However, frequency error in the receiver due to the use of a low cost oscillator can restrict the coherency time to less than 256 chips. In an exemplary embodiment, the coherent correlation length (matched filter length) is only 64 chips to allow for frequency error; four 64-chip correlations then have their magnitudes accumulated non-coherently to form a 256-chip correlation at step 4. Optionally, the four 64-chip correlations can be further processed to estimate a frequency error, as further elaborated later. If and when an opportunity arises to correct the oscillator's error, a note can be made of that and subsequent 256-chip correlations can be coherent correlations.

For example, the oscillator can be calibrated whenever synchronisation is confirmed with a valid transmitter and a note recorded against the temperature at which calibration was made. Subsequent sync searches made at temperatures for which the oscillator has been calibrated can use 256-chip correlation while at other temperatures 64-chip coherent correlations would be made.

At step 5, coherent or non-coherent correlations from step 4 are accumulated in the 2560 timing bins. If accumulation continues too long, frequency error in the receiver's chip rate relative to the transmitter's chip rate can cause a drift in the correspondence of timing bins to a particular timing. This problem was solved by the disclosure of U.S. patent application Ser. No. 08/768,975 to Dent, filed Dec. 18, 1996 which is hereby incorporated by reference herein. In the above application, drift is compensated by accumulating the largest of three adjacent previous cumulative values with a new correlation, thus allowing a timing drift of +/– one bin. In the exemplary system, the frequency error is much smaller than that which would cause a drift of one chip per 2560 chips. A +/–10 ppm frequency error will rather cause a 1 chip error in 100000 chips, or 40 slots of 2560 chips. Consequently, accumulation of corresponding values can take place in corresponding bins for up to 40 slots, and then the 2560, 40-slot, block-cumulative values are accumulated with the 2560 cumulative bins using drift compensation according to the incorporated patent application. The need for 2×2560 memories can be avoided, by first processing the previous, cumulative bin values to determine the largest value in every adjacent group of three bins. The bin values are then replaced by this largest of three. Then each new correlation value for the next 40 slots is accumulated in a corresponding one of the replaced bins. After 40 slots, the "best-of-3" operation is repeated prior to continuing.

In practice, the exemplary system performs the "best-of-3" operation every 16 slots, corresponding to the exemplary 10 mS frame period of FIG. 3. In this way, cumulative correlation can continue indefinitely until something is detected, thus solving the "high-penetration sync" aim.

Even in the absence of a signal however, non-coherent accumulation of correlation magnitudes results in numerically growing values due to noise. To prevent indefinite numerical growth, it is useful to subtract the smallest value over all 256 bins from all the values, one bin then being zero and the non-zero bins indicating the margin by which they exceed the "noise" value. This differential value is in fact more useful for detecting the presence of a signal. A predetermined threshold can be established against which the differential bin values are compared. If a bin value exceeds this threshold, it indicates that correlation with the associated timing value exceeded correlation with all other chipshifts by a significant margin, indicating the likelihood, if not the certainty, that a signal exists with that timing.

One reason why certainty of detection does not exist with a single-stage sync detection algorithm is that the propagation path from a transmitter to a receiver can comprise many paths with different delays separated in time by one or more chips. Therefore each timing bin only accumulates that fraction of the energy received in a single ray; moreover multiple rays lead to multiple bins exhibiting correlations, so that there is uncertainty in which one to believe. The preferred algorithm is to continue drift-compensated accumulation of differential bin values until one bin value becomes the first to exceed the first detection threshold, as detected at step 6. If no bin exceeds the threshold after an accumulation cycle, at step 7 the receiver compares the time spent accumulating correlations on this frequency channel with a timeout limit. If the time limit is exceeded, further search is deemed useless and a return is made to step 3 to try tuning the next frequency channel in the list. The timeout limit can be adjusted in dependence on the measured signal strength values on the channel, so that a longer search time is allowed when the channel is weak. If all channels are weak, as measured at step 1, it can be an indication that the user is deep indoors and a much longer timeout used. Moreover, a different prioritization of the frequency channels to search can be employed if it is suspected that a "high-penetration" sync search must be performed.

If a bin exceeds the first detect threshold at step 6, step 8 of FIG. 2(*b*) is entered. At step 8 of FIG. 2(*b*), the just detected bin value is reset to zero and the timing (and optionally any frequency error that has been estimated during correlation) for that bin, i.e. the bin number, is recorded in a second list as a "candidate" or "possible" signal. Correlations then continue to be made and accumulated according to the method shown in FIG. 2(*a*), except that changing frequency channel due to timeout is inhibited as long as the second list is not empty. Maintaining the same tuned frequency permits techniques according to the present invention to attempt a second stage of synchronisation on the channel on which first stage sync is detected. Although the inventive correlator of the above-incorporated applications can perform correlations of the same received signal samples with many different codes and code-shifts simultaneously, the receiver cannot receive signal samples on two or more different frequency channels simultaneously, and so the choice of channel is frozen during performance of second stage of synchronization illustrated in FIG. 2(b).

Figure 2B:
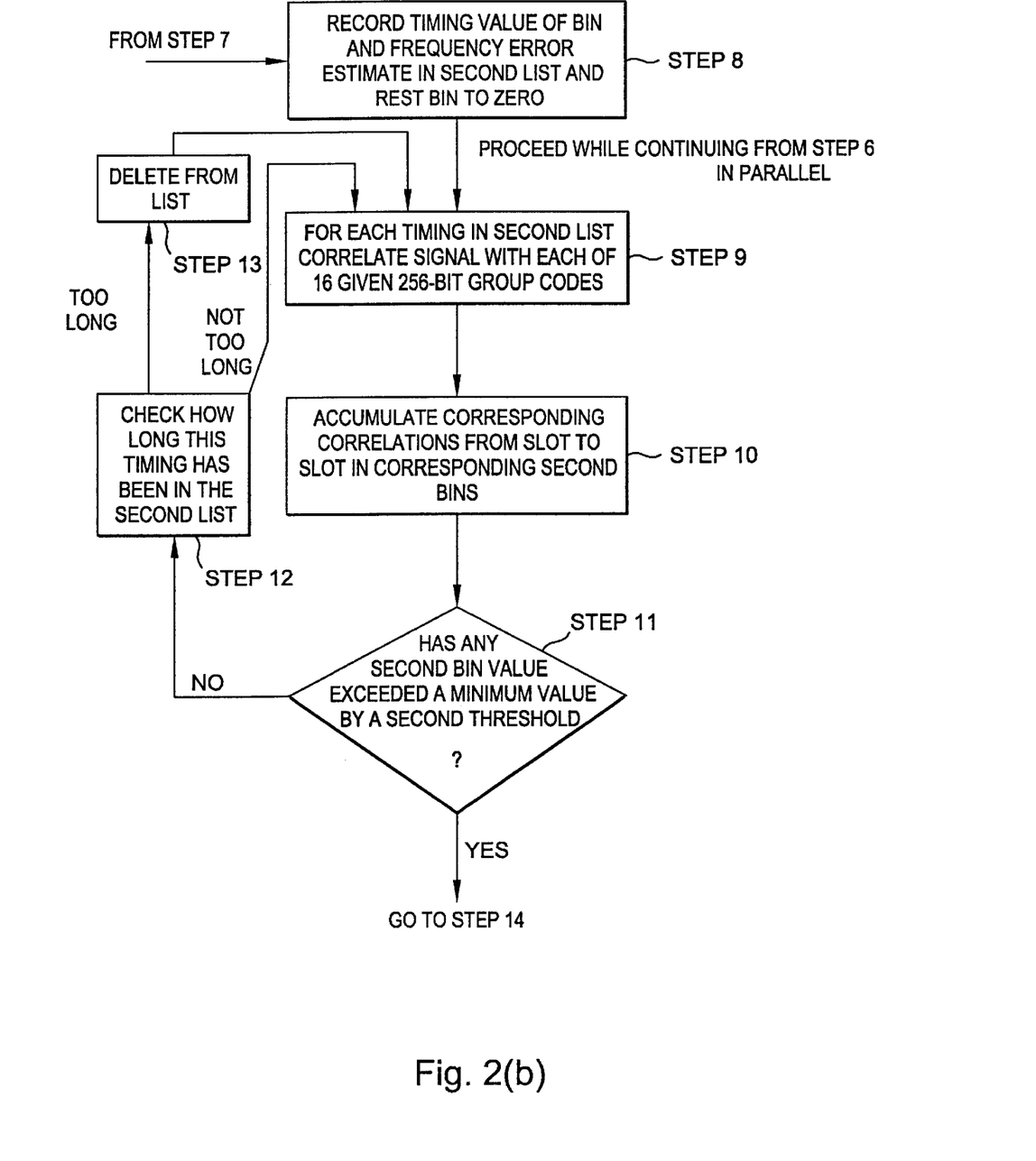

In FIG. 2(b), the received signal is correlated at step 9 with each of 16 possible PERCH 2 256-chip codes. If coarse frequency error has been supplied from stage 1 sync detection, these 256-chip correlations may be coherent correlations. It will be explained later how the factor of four reduction in frequency error needed to increase the coherent correlation length from 64 to 256 chips is implemented.

The timing having been supplied from stage 1 sync, the timing uncertainty to be searched using the technique in FIG. 2(b) is limited. For example, if the multipath delay spread is a maximum of 16 microseconds, only 64 timing bins are needed. However, there are 16 different codes, and 64 timing bins are needed for each, making 1024 bins altogether. At step 10, correlations are accumulated in bins corresponding to one of 16 codes and one of 64 timings for all candidates in the second list, thus there are multiple banks of 1024 bins required in the case of multiple candidates to be tested. Ultimately, the number of simultaneously processed candidates can be limited by the amount of memory. Candidates in the list that cannot be processed for lack of memory may be processed later after a previous candidate has been rejected at step 13.

Drift compensation may be applied as before using a "best of 3" operation every 10 mS frame. However, subtraction of the minimum value of these bins from all of them is not necessarily a good idea, as the timing has been so restricted that all timings and codes could conceivably contain valid signal energy arriving from more than one nearby base station transmitter. Therefore the minimum bin value from the bins of FIG. 2(a) can be used as a noise floor and subtracted from all the bins of FIG. 2(b) as well as all the bins of FIG. 2(a). If any bin value in FIG. 2(b) is then detected at step 11 to have exceeded this noise floor by more than a second threshold, step 14 is entered in FIG. 4. On the other hand, if no bin exceeds the second threshold, a test is made at step 12 to determine if enough time has been spent testing any of the timings in the second list. If so, the timing that has been tested for longer than the timeout period is deleted from the list. When all timings have been deleted from the list, the frequency channel change steps 7, 8 of FIG. 2(a) may be re-enabled.

Figure 2C:
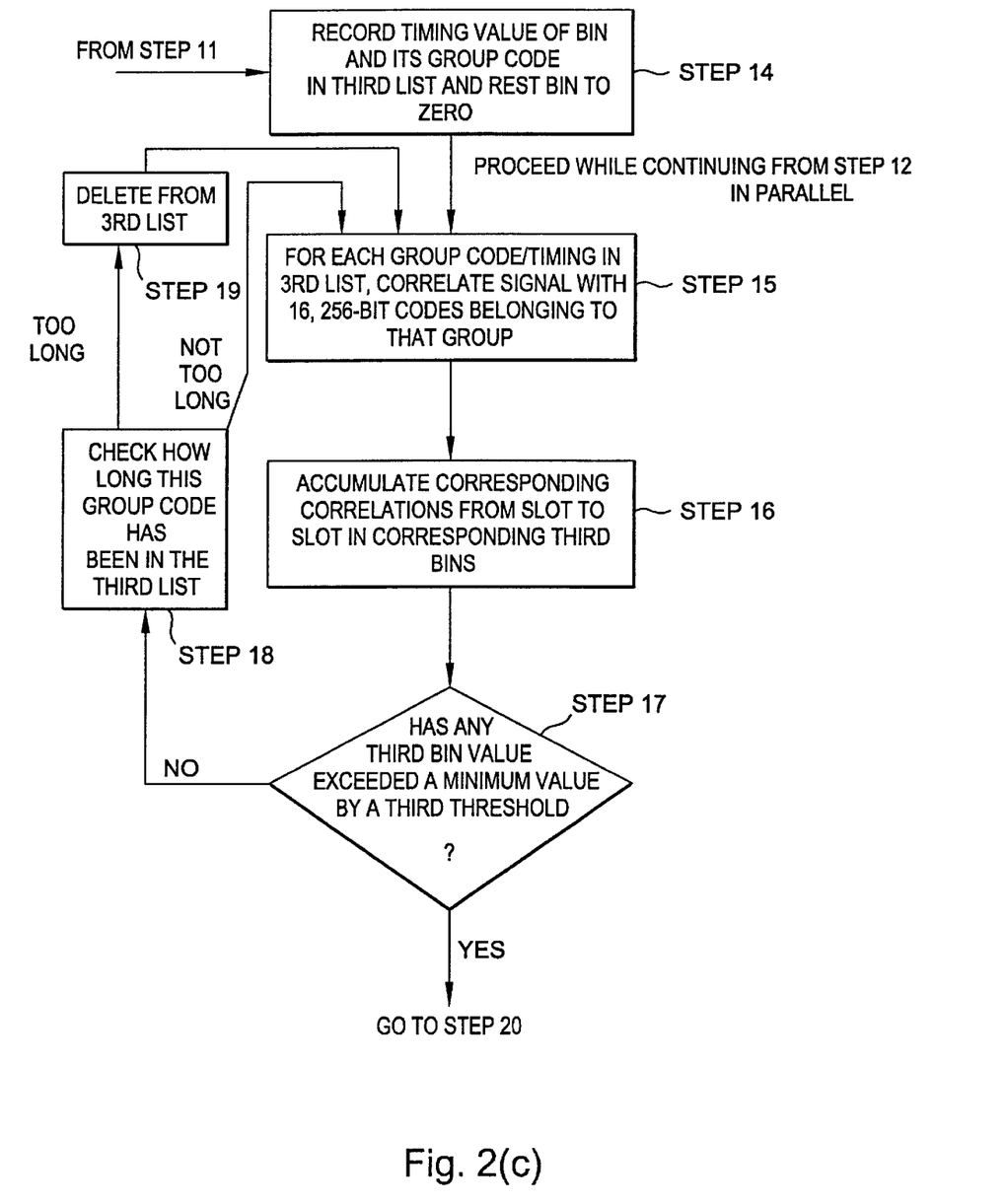

Referring now to FIG. 2(c), step 14 is entered with a timing value and code giving a second threshold detection at step 11. This is recorded in a third list, allowing again for multiple candidates. The PERCH 2 code detected at step 11 indicates one of 16 groups of codes, each group containing 16 codes, that the transmitter may be using for coding the other nine symbols per slot of the paging channel. Consequently correlations are now performed using the timing and coarse frequency error from previous steps with the nine other paging channel symbols using each of the 16 codes in the indicated group. These are accumulated as before in a limited number of timing bins times the 16 code bins. When one of these third banks of bins is detected at step 17 to exceed a third threshold above the noise floor, the code used by the transmitter is uniquely suggested and is conveyed to a fourth list at step 20 of FIG. 2(d) for confirmation. It may be seen that FIG. 2(c) operates similarly to FIG. 2(b) and so will not be elaborated further. A person skilled in the art will realize that the operations of flow charts of FIGS. 2(a)–2(d) can be controlled by a microprocessor (not shown) using a suitable software program, and that software programs that are identical apart from the data memory elements they operate on do not need to be stored in multiple copies, but can be given the property of re-entrancy that allows a single program to be multiply active in different states and quasi-simultaneously to process different data and even in different ways controlled by different parameters.

Figure 2D:
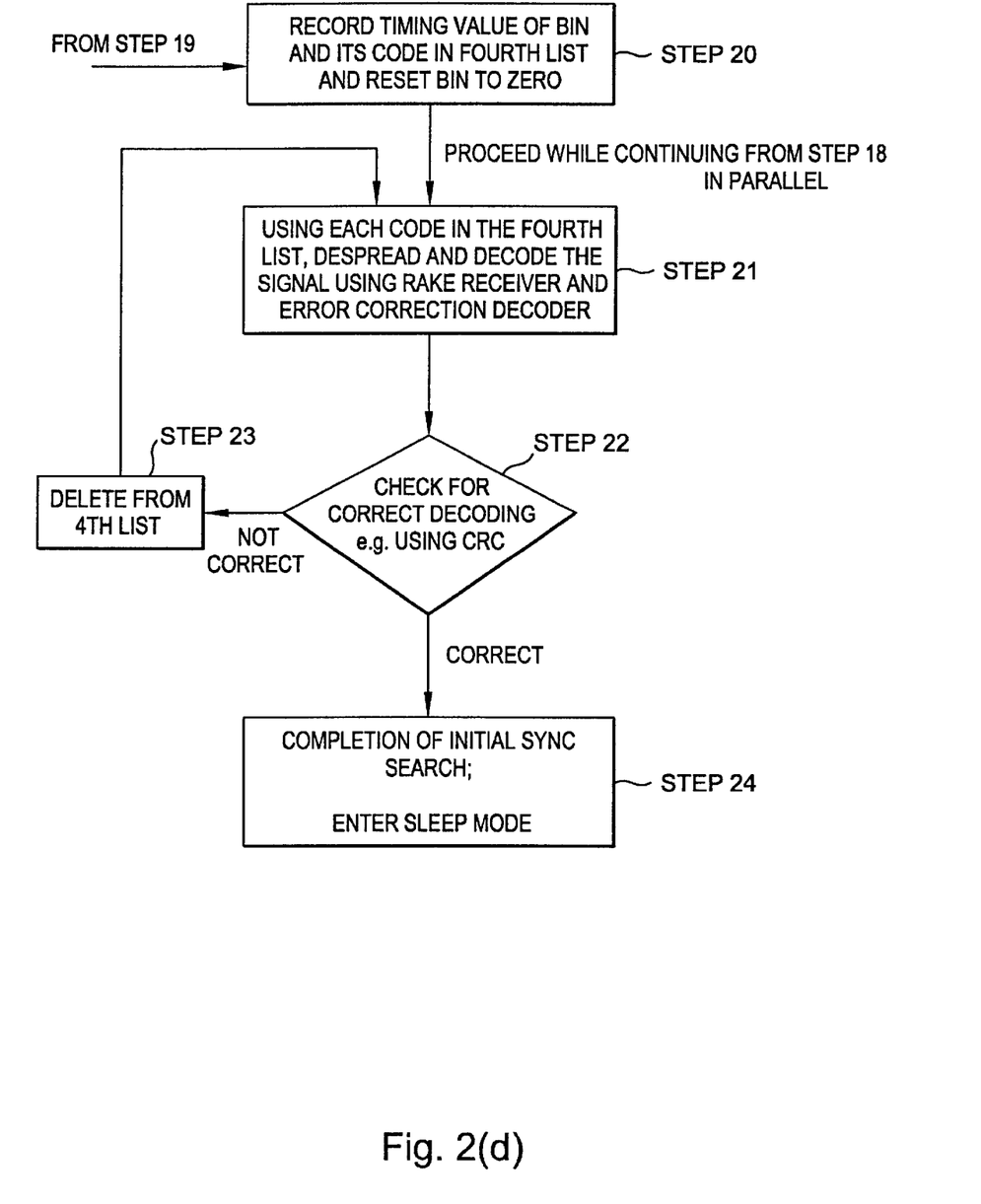

Now referring to FIG. 2(d), step 20 is entered having identified one of in total 256 codes that the detected transmitter is thought to be using to code the paging channel signal. It may be that more than one candidate code has been detected, for example due to the mobile station being within range of more than one base station transmitter using the same frequency channel. Therefore the just-identified signal parameters are entered into a fourth list with any other codes, timings and frequency errors already in the list. At step 21 an attempt is made to decode the signal at the top of the list. If the signal is a CDMA signal, a RAKE receiver (not shown) may be appropriate to perform this decoding step. The RAKE receiver first performs correlations with known codes based on the identified unique code of this transmitter to establish the phase and amplitudes (i.e. complex channel parameters) of each significant multipath ray reaching the receiver. The RAKE receiver then uses the code in correlation with unknown data symbols using the timing shifts of the established significant rays. The results of correlation with unknown data symbols are combined using weighting factors based on the established complex channel parameters for each ray. The combined value is then submitted as a "soft decision" to an error correction decoding algorithm to decode information transmitted on the paging channel. More details of RAKE receivers may be found in U.S. Pat. Nos. 5,305,349 and 5,572,552 to Applicant which are hereby incorporated by reference herein.

After error correction decoding of the signal at step 21, a test for correct decoding is made at step 22. This can be done for example with the aid of a Cyclic Redundancy Check (CRC) code. If the CRC code does not check, this may be an indication that the signal in the fourth list was a false signal or of low signal quality. Rejection of the signal and deletion from the fourth list may occur as a result of several successive failures of the CRC check. As with all the steps of FIGS. 2(a)–2(d) presented here, attempted decoding of one, any or all of the signals with parameters recorded in the fourth list can in principle be done simultaneously, and while the earlier synchronisation detection stages are also still proceeding. In this context "simultaneously" means processing the same received signal in many different ways corresponding to searching for a PERCH 1 burst, a PERCH 2 burst or CRC check using different despreading codes. The term "simultaneously" does not necessarily imply multiple copies of decoding hardware, as sufficiently fast hardware can be time-shared, i.e. operated sequentially, to process the same stored data in many different ways. The amount of parallelism provided in the hardware to obtain the desired processing ability is a design trade-off that is not material to the inventive principles disclosed above.

Using the invention, a multi-stage synchronisation process is implemented with the aim of reducing the time needed to acquire synchronisation with a signal such as a spread-spectrum signal. The first stage of the sync process is designed to speed detection of any signal, by limiting the number of codes used for the first detection stage and accepting a higher probability of false alarms. Later stages of synchronisation are performed using only the limited number of candidate signals defined by the parameters identified in the earlier stage, and aim to successively limit the number of signal candidates retained for further testing while improving the confidence that a retained signal is a true signal. The final step of successfully decoding a paging channel broadcast confirms detection of a true signal. When a true signal is detected and decoded, further information may be read by the receiver regarding surrounding stations, frequencies and other parameters of the network. The receiver may also measure its frequency error relative to a true signal and store a frequency calibration value for the prevailing temperature, in order to learn a frequency/temperature correction table for its reference oscillator with which to accelerate synchronisation on future occasions.

When initially a receiver has no preexisting frequency/temperature calibration table, coherent correlation lengths may be restricted, as described above. Coherent correlations of limited length have to be combined or accumulated non-coherently to produce correlations over longer periods. This can be accomplished using non-coherent accumulation or combination devices to compute the magnitude (or magnitude squared) of a complex correlation value and combine the magnitudes. Non-coherent correlation will always produce a positive result that grows with time, and is therefore more liable to falsely exceed a detect threshold than a coherent correlation. Consequently it is of interest to estimate frequency error from a preceding, non-coherent stage of correlation (e.g. that of FIG. 1(a)) in order to permit a subsequent stage of correlation to be performed coherently by compensating for the estimated frequency error (e.g. the stage described by FIG. 2(b)).

In the exemplary system, the synchronization codes transmitted are of length 256 while the maximum coherent correlation length imposed by frequency error is 64. To permit the full coherent correlation length of 256 to be used, it is therefore necessary to reduce the frequency error by a factor of four. This may be done in the following exemplary manner.

In FIG. 2a), 64-point correlations are computed for four, successive 64-symbol blocks over a 256-symbol block. Denoting these by the complex numbers I1+jQ1

I2+jQ2

I3+jQ3 and I4+jQ4, non-coherent combination of these would normally comprise computing $SQRT(I1^2+Q1^2)+SQRT(I2^2+Q2^2)+SQRT(I3^2+Q3^2)+SQRT(I4^2+Q4^2)$ or alternatively the sum-of-squares $I1^2+Q1^2+I22+Q2^2+I3^2+Q3^2+I4^2+Q4^2$ Coherent combination, if the frequency error was zero, would comprise computing (I1+I2+I3+I4)+j(Q1+Q2+Q3+Q4).

Consider now a frequency error that gives rise to a 90 degree phase rotation over each 64-symbol correlation interval, equivalent to a multiplication by "j" for a positive frequency error or by −j for a negative frequency error.

Then, for positive frequency error the correlations would correspond to

I1+jQ1 jI2−Q2 (having been multiplied by j)

−I3−jQ3 (having been multiplied by $j^2$)

and −jI4+Q4 (having been multiplied by $j^3$)

The sum of the real parts is then I1−Q2−I3+Q4 and the sum of imaginary parts is Q1+I2−Q3−I4.

For negative frequency error, the corresponding combinations would be

I1+Q2−I3−Q4 and QI−I2−Q3−Q4

For a frequency error, positive or negative, that gives 180 degrees phase shift per 64-symbol correlation interval, the corresponding accumulations would be I1−I2+I3−I4 and Q1−Q2+Q3−Q4

Collecting all of the above, we obtain four different ways to accumulate four 64-symbol correlations:

1) I1+I2+I3+I4 Q1+Q2+Q3+Q4 for small frequency error
2) I1−Q2−I3+Q4 Q1+I2−Q3−T4 for +90 degrees per 64 chips
3) I1+Q2−I3−Q4 Q1−I2−Q3+I4 for −90 degrees per 64 chips
4) I1−I2+I3−I4 Q1−Q2+Q3−Q4 for +/—180 degrees per 64 chips A person skilled in the art will recognize the above as computing a four-point FFT. If desired, the correlation results can be combined instead with phase rotations of +/−45 degrees and +/−135 degrees instead of 0, +/−90 and +/−180 degrees to avoid the frequency error sign ambiguity of the +/−180 degree combination. This would slightly modify the transition rules for drift compensated accumulation disclosed below, but nevertheless in a manner that may be fully derived by a person of average skill in the art with the help of these teachings.

An implementation of the current invention which provides the highest performance therefore comprises accumulating four 64-symbol correlations using all four of the above formulae. Then the magnitudes of the resulting 256-chip correlations are accumulated from one signal repetition period to the next (i.e. slot-to-slot in the exemplary format of FIG. 3) in a set of 4×2560 bins, each set of 2560 bins corresponding to one of the above frequency error assumptions.

When a bin value exceeds a detect threshold, the bin number then yields both a timing value (1–2560) and a frequency error (1–4) to use for accumulating correlations in FIG. 2(b). Note that it does not matter at this stage that with frequency error (4) we cannot tell if it is positive or negative. If the accumulation of type (4) above gave largest correlation for sync detect stage 1, then it should also give correct accumulation for sync detect stage 2.

It is seen that the above provides a means to classify frequency error into one of four smaller errors of ¼ the error, as needed to allow 256-symbol coherent correlations.

It is also possible to improve drift-compensated accumulation when frequency error is detected in the above way. As described above, a bin value may be periodically replaced by the largest of three adjacent values to allow for a one-bin timing drift over the period. If a bin is replaced by the next highest numbered bin value, it is an indication that the received frequency was low relative to the receiver's frequency reference crystal oscillator and had drifted "late". Conversely, replacing a bin value by the next lower bin number indicates that the received frequency was high.

In the case of simultaneous frequency error detection using 4×256 bins, let the bins be numbered using two indices j, k with k ranging from 1 to 2560 and j ranging from −1 to +3 to indicate frequency nominal (j=0); frequency high (j=1); frequency low (j=−1) and frequency very high or low (j=+3).

Now, when a bin with second index k is replaced with a value from a bin with second index k−1, it indicates that the receiver's frequency was low compared to the received signal. Thus, to be consistent, this should only occur for a second index j equal to −1 or +3; conversely, replacing bin value index k with k+1 should only be allowed for j=+1 or +3. Replacing bin value index k with itself implies no frequency error, so should be done only for j=0.

In practice, due to frequency error not falling exactly into one of the four categories, some opportunity for "cross-fertilization" should be allowed, resulting in the following strategy:

1) Replace bin(0,k) by the largest of bin(0,k), bin(−1,k−1) and bin (1,k+1)
   (frequency nominal, a bit low or a bit high)
2) Replace bin(1,k) by the largest of bin(1,k), bin(1,k+1) and bin(3,k+2)
   (frequency more than a bit high)
3) Replace bin(−1,k) by the largest of bin(−1,k), bin(−1, k−1) and bin(3,k−2)
   (frequency more than a bit low)
4) Replace bin(3,k) by the largest of bin(1,k+1), bin(−1, k−1), bin(3,k−2) and bin(3,k+2)
   (frequency very high or very low)

A person skilled in the art may devise other transition rules based on the same logic, namely that if symbol rates and radio frequency are derived at the transmitter and receiver from the same reference oscillators, then the sign of timing drift must be related to the sign of frequency error. The above transition rules thus involve less computation than finding the largest of twelve values (4 frequency errors times 3 timing drifts of early, late and nominal), but may be restricted to finding the largest of 3 or 4 values.

The use of a four-point FFT for simultaneously accumulating correlations in four different ways corresponding to different frequency error postulates may of course be extended to larger FFTs for finer resolution of frequency error. An advantage of four-point FFTs however, which are sufficient for the preferred system parameters, is that they do not require any multiplications but require only additions, which reduces the complexity of the inventive receiver according to the invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A multi-stage synchronization method for synchronizing a receiver with a transmitted signal, comprising the steps of:
   selecting a frequency channel and receiving a signal;
   filtering, amplifying and sampling said signal to generate signal samples for processing;
   performing a first stage of synchronization comprising correlating said signal samples with a first code at different timing offsets to generate a plurality of candidate signal timings;
   performing a second stage of synchronization in parallel with said first stage of synchronization, said second stage comprising correlating said signal samples with at least one second code, using only said at least one candidate signal timing; and
   processing said signal samples using a code related to said second code to decode said signal samples; and
   testing for correct decoding of said signal samples to verify correct synchronization.

2. The method of claim 1, wherein said second stage of synchronization generates at least one correlation timing and associated group code, said method further comprising:
   performing a third stage of synchronization in parallel with said first stage and said second stage, said third stage comprising correlating said signal samples with a plurality of codes identified by said group code.

3. The method of claim 1 wherein filtering, amplifying and sampling said signal to generate signal samples for processing comprises:
   analog-to-digital converting said signal at a sampling rate of at least one sample per signaling symbol interval.

4. The method of claim 1 in which said first stage of synchronization comprises:
   correlating a selected block of signal samples with corresponding symbols of said first code, selecting each signal sample in turn to be the start of said block.

5. The method of claim 4 in which said block correlations are performed using a sliding correlator.

6. The method of claim 4 in which said block correlations are performed using a matched filter.

7. The method of claim 4 wherein correlating said selected block of signal samples with corresponding symbols of said first code comprises:
   coherently correlating said selected block of signal samples with corresponding symbols of said first code.

8. The method of claim 7 wherein correlating said selected block of signal samples with corresponding symbols of said first code further comprises:
   non-coherently accumulating said coherently correlations in a plurality of bins, each bin corresponding to a candidate signal timing.

9. The method of claim 8 further comprising:
   compensating said accumulation for timing drift.

10. The method of claim 9 wherein compensating said accumulation for timing drift further comprises:
    periodically replacing a bin value by a largest of three adjacent bin values.

11. The method of claim 10, wherein said period is related to an accumulation time over which timing drift of the order of one signaling symbol is likely.

12. The method of claim 8 further comprising:
    subtracting a minimum value over all of said bins, from all of said bins to prevent numerical growth and to form differential bin values.

13. The method of claim 12 wherein a candidate signal timing is determined when one of said differential bin values exceeds a predetermined threshold.

14. The method of claim 13 further comprising, when a bin value exceeds said predetermined threshold:
    recording said candidate signal timing;
    setting said bin value to zero; and
    continuing said non-coherent accumulation in said bin.

15. The method of claim 1 wherein said transmitted signal includes a repetitive pattern with a fixed repetition period of a whole number of signaling symbols.

16. The method of claim 15 wherein performing a first stage of synchronization comprises:
    forming a correlation value for each alignment of said first code with a symbol position within said repetition period; and
    accumulating said correlation values having the same alignment in successive repetition periods in a bin for each alignment.

17. The method of claim 1 wherein performing said first stage of synchronization further comprises estimating a frequency error associated with said received signal.

18. The method of claim 17 wherein performing said second stage of synchronization further comprises using said frequency error estimate to compensate said signal for phase shift.

19. The method of claim 18 wherein correlating the same said samples with at least one second code in said second stage of synchronization further comprises:

performing a coherent correlation between the same said samples with at least one second code; and using said phase shift compensation to perform said coherent correlation over a longer interval.

20. The method of claim 1 wherein selecting a frequency channel comprises:

selecting said frequency channel from a prioritized channel list.

21. The method of claim 20 herein said prioritized channel list is prioritized based on memorized historical information.

22. The method of claim 20 wherein said prioritized channel list is prioritized in order of received signal strength on each channel.

23. The method of claim 20 wherein said prioritized channel list is prioritized based on the channels on which synchronization was achieved most recently.

24. The method of claim 20 wherein said prioritized channel list is prioritized such that channels on which synchronization has not historically been achieved are given a low priority.

25. The method of claim 20 in which said channel list is prioritized based on measured received signal strength on each channel and on historical information.

26. The method of claim 25 in which channels with signal strength above a threshold at which synchronization has previously been achieved are given a high priority and channels with signal strength below a threshold at which synchronization has previously not been achieved are given a low priority.

27. A method for synchronizing a receiver with a transmitted signal comprising the steps of:

sequentially tuning said receiver to successive frequency channels and measuring received signals strength on said channels;

forming said frequency channels into a first list for testing in a prioritized order;

tuning said receiver to the channel in said first list with highest priority and receiving a signal;

starting a timer to record time spent tuned to said channel and to compare the recorded time with a time-out value;

filtering, amplifying and sampling the received signal to generate signal samples for processing;

processing said signal samples using a first code to detect correlation with said first code;

upon detecting correlation with said first code, recording in a second list the timing position within said signal samples of each such detected correlation;

if said second list contains one or more entries, processing said signal samples to detect correlation with at least one second code at the corresponding recorded timing position, said processing concurrent with said processing said signal samples using a first code to detect correlation with said first code; and if said timer reaches said time-out value, retuning said receiver to the channel of next highest priority in said first list and resetting said timer.

28. A receiver for detection of synchronization with a transmitter, comprising:

a filtering, amplifying and conversion circuit for receiving signals and producing signal samples for processing;

a correlator for correlating said signal samples with a first code using time-shifts between said received signal samples and said first code and for correlating said same signal samples with at least one second code at specified time shifts, simultaneously with correlating said signal samples with said first code;

a first detector for detecting time shifts at which correlation with said first code exceeds a first threshold and recording said time-shifts in a first memory;

a controller for specifying the time-shifts to said correlation means for performing correlations with said at least one second code based on the time-shifts recorded in said first memory;

a second detector for detecting when a correlation with said at least one second code specified by said control means exceeds a second threshold and for recording the associated at least one second code and time-shift in a second memory;

a confirmation unit for processing said same signal samples using a code based on said second code to decode information and performing a decoding error check; and a deletion unit for deleting records from said second memory when said confirmation unit indicates decoding error.

29. A method of synchronizing a receiver with a transmitted signal, said transmitted signal comprising a first and second repeated coded pattern having a determined repetition period, comprising the steps of:

selecting a frequency channel and receiving a signal;

filtering, amplifying and sampling the signal to generate signal samples for processing;

correlating said signal samples with said first coded pattern using different timing shifts in said repetition period between said first coded pattern and said signal samples to produce a first correlation value for each time shift;

accumulating correlation values that correspond to the same time shift in successive repetition periods in corresponding timing bins;

detecting when the cumulative value in one of said timing bins exceeds the value in another of said timing bins by more than a first threshold and recording the tuning bin number in a first memory;

when said memory contains at least one timing bin number, correlating said same signal samples with said second repeated code pattern using timing shifts corresponding to said recorded timing bin numbers, simultaneously with correlating said signal samples with said first coded pattern, and producing corresponding second correlation values; and accumulating said second correlation values in a number of second bins, each corresponding to an entry recorded in said first memory while continuing to accumulate said first correlation values in said timing bins.

30. A method for time-synchronizing a receiver with a transmitted signal and determining a coarse frequency error estimate, comprising the steps of:

computing correlations between received signal samples and known symbols included in said transmitted signal at periodic intervals, using several time shifts between said received signal samples and said known symbols corresponding to early and late timing postulates;

combining successive correlations corresponding to the same timing postulate using a combining method with no frequency error compensation to obtain first cumulative correlations;

combining correlations made with successively later timing postulates using a combining method compensated for a receiver frequency that is relatively high compared to the transmitted signal frequency to obtain second cumulative correlations;

combining correlations made with successively earlier timing postulates using a combining method compensated for a receiver frequency that is relatively low compared to the transmitted signal frequency to obtain third cumulative correlations; and determining the largest of said first, second and third correlations to determine a timing and a coarse frequency error estimate.

* * * * *